United States Patent [19]

Kaminaka et al.

[11] Patent Number: 4,512,368
[45] Date of Patent: Apr. 23, 1985

[54] FLUID DISTRIBUTOR

[75] Inventors: Motofumi Kaminaka, Wakayama; Hiroyuki Takashima, Ibaragi; Katsuhiko Kaburagi, Wakayama, all of Japan

[73] Assignee: Sumitomo Metal Industries, Ltd., Osaka, Japan

[21] Appl. No.: 472,877

[22] Filed: Mar. 8, 1983

[30] Foreign Application Priority Data

Mar. 20, 1982 [JP] Japan ............................ 57-39992[U]

[51] Int. Cl.³ .............................................. F16L 41/00
[52] U.S. Cl. .............................. 137/561 A; 137/561 R
[58] Field of Search ....................... 137/561 A, 561 R

[56] References Cited

U.S. PATENT DOCUMENTS

| 2,771,092 | 11/1956 | Schenk | 137/561 R |
| 3,795,259 | 3/1974 | Brandin et al. | 137/561 A |
| 3,864,938 | 2/1975 | Hayes, Jr. | 137/561 A |
| 3,899,000 | 8/1975 | Ohlswager et al. | 137/561 A |
| 4,256,140 | 3/1981 | Swaroop et al. | 137/561 A |
| 4,284,243 | 8/1981 | Shaner | 137/561 A |

FOREIGN PATENT DOCUMENTS 74392  1/1947  Netherlands .................. 137/561 A Primary Examiner—A. Michael Chambers
Attorney, Agent, or Firm—Burns, Doane, Swecker & Mathis

[57] ABSTRACT

A distributor for distributing a fluid from a main pipe to a plurality of branch pipes is disclosed which comprises a cylindrical inlet pipe portion for the introduction of fluid supplied through a main pipe, a branching portion one end of which concentrically communicates with said inlet pipe portion, a cover portion located at the other end of said branching portion, and a plurality of branch pipes which extend through said cover portion for carrying a distributed fluid, the diameter of said branching portion being larger than that of said inlet pipe portion, said plurality of branch pipes being arranged at equally spaced positions on a circle which is concentric with said branching portion, and each of said branch pipes extending into said branching portion.

20 Claims, 9 Drawing Figures

FLUID DISTRIBUTOR

BACKGROUND OF THE INVENTION

The present invention relates to a distributor for distributing a fluid to a plurality of destinations.

A finely powdered coal, for example, is quarried out from a hopper into a main supply pipe and then is conveyed to its destination, e.g. to a plurality of powdered coal burners, which are provided in a combustion furnace. In order to distribute finely powdered coal together with a carrier gas such as a solid-gas two phase fluid to a plurality of burners, a plurality of branch pipes extending to the corresponding burners, respectively, are provided with a quantitative feeder, such as a helical screw feeder, rotary vane feeder, table feeder, etc., which measures and supplies the finely powdered coal to these branch pipes.

However, conventional feeders require one quantitative feeder for each branch pipe. This makes the control of the feeders complicated as well as increases the initial cost.

A distributor has been devised to overcome such drawbacks, which comprises a hollow header through which a fluid in a main pipe is in communication with a plurality of branch pipes. The distributor of this type, however, does not achieve uniform distribution of the fluid.

The distributor shown in FIG. 1 is a conventional one which comprises a hollow header 12 connected to a plurality of branch pipes 13. The powdered coal quarried out from a hopper (not shown) is conveyed through a main pipe 11 to the hollow header 12, in which the powdered coal carried on a carrier gas is distributed to each of the branch pipes 13 which lead to respective burners of a combustion-heated furnace (not shown). The above embodiment, however, presents a problem that it is difficult to precisely control the flow rate of powdered coal in each of the branch pipes, resulting in wide fluctuations in the flow rate of powdered coal in each of the branch pipes. Thus, it is impossible to attain a uniform distribution with this distributor. This is because the fluid in the main pipe is not under a steady flow and because the center of the fluid supplied through the main pipe is biased when it diverges or enters into the header 12.

SUMMARY OF THE INVENTION

The present invention has been accomplished in the light of the above-mentioned situation, and a major object of the present invention is to provide a distributor which is free of the above-mentioned disadvantages.

Thus, according to the present invention, a fluid distributor which provides a uniform distribution of a fluid containing solids carried on a carrier gas in a uniform steady flow is introduced.

DESCRIPTION OF PREFERRED EMBODIMENTS

Figure 1:
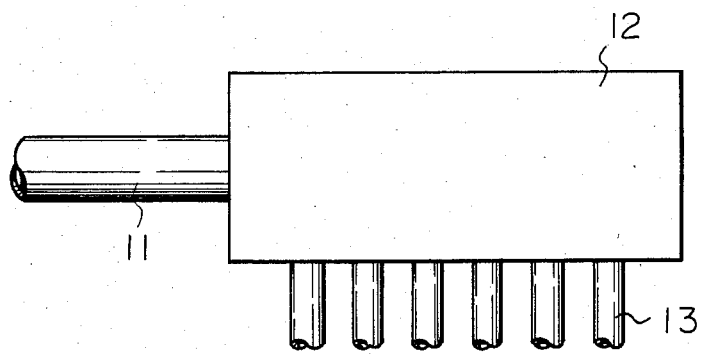
FIG. 1 is a side view schematically showing a prior art distributor utilizing a hollow header.

The present invention will be described in detail with reference to the drawings which schematically illustrate some preferred embodiments of the present invention. In the drawings, similar portions are represented by similar numerals.

Figure 2:
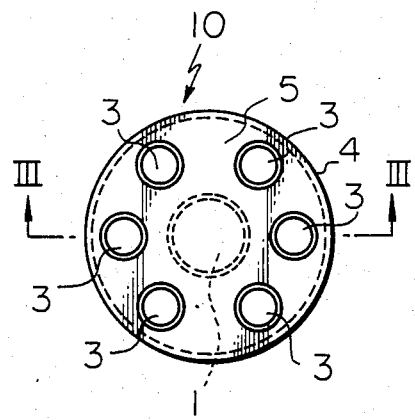
FIG. 2 is a plan view of a fluid distributor according to the present invention.
Figure 3:
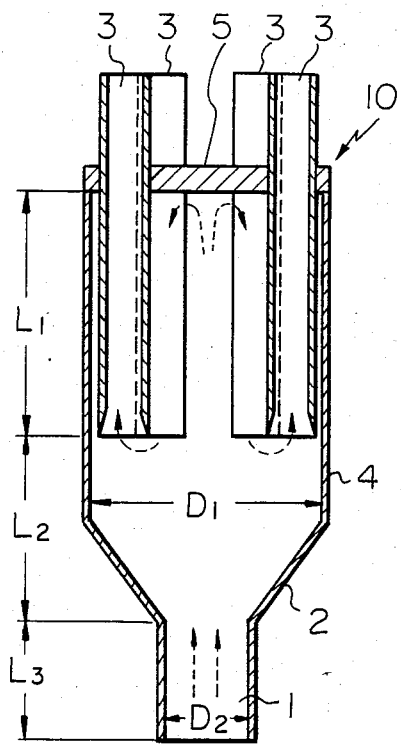
FIG. 3 is a sectional view taken along the line III—III of FIG. 2.

FIG. 2 is a plan view of the distributor 10 of the present invention (hereunder referred to as the "present device"), and FIG. 3 is a side sectional view taken along the III—III line of FIG. 2.

As is apparent from FIG. 3, the present device 10 comprises a cylindrical inlet pipe portion 1, a divergent portion 2, a branching portion 4 and a cover portion 5. The inlet pipe portion 1 is connected to a main pipe for fluid supply. The inlet pipe portion 1 may constitute part of the ending portion of the main pipe. The inlet pipe portion 1 concentrically connects with the cylindrical branching portion 4 through the divergent portion 2 which is frust-conically shaped. The upper end surface of said branching portion 4 is covered with the disc-shaped cover portion 5. A plurality of branch pipes 3, for example six branch pipes each of which leads to a respective burner, extend through the cover portion 5, and have an open end portion within the branching portion 4. The branch pipes 3 may constitute part of the starting portion of fuel-supply pipes leading to the burners. The centers of the respective branch pipes 3 are located at equally spaced positions along a circle which is concentric with said branching portion 4. Each branch pipe 3 extends into the branching portion 4 for an equal distance. The six branch pipes 3 have their open ends positioned on the same plane. That is, the distance $L_2$ between the ends of the branch pipes 3 and the end of the inlet pipe portion 1 is the same for all the branch pipes.

All the branch pipes 3 are placed in parallel with the inlet pipe portion 1 and are, as shown in FIG. 2, positioned outside of the diameter of the inlet pipe portion 1 in its plan view. The diameter $D_1$, therefore, is larger than $D_2$.

According to the construction mentioned above, the fluid supplied through the main pipe flows into the branching portion 4 through the inlet pipe portion 1, and goes straight on through said brahching portion 4. Though part of the fluid is directly supplied to the branch pipes 3, most of the fluid strikes the cover portion 5, is reversed in direction and supplied to its destination, such as the burners of a combustion furnace, through the branch pipes 3. Since these branch pipes 3 are located at equally spaced positions along a circle being concentric with the branching portion 4, the fluid coming through the inlet pipe portion 1 passes an area surrounded by the branch pipes 3 and goes straight on along the longitudinal axis of the branching portion 4 without being deviated. The fluid is then reversed in direction by the cover portion 5 to produce a steady flow of fluid through the branching portion 4. Thereafter, the fluid flows into the respective branch pipes 3.

It is desirable that the length $L_3$ of the inlet pipe portion 1 be long enough to produce a steady flow within the inlet pipe portion 1. It is desirable, therefore, that the length $L_3$ be more than the diameter $D_2$ of the inlet pipe portion 1 ($L_3 > D_2$), preferably more than twice the diameter $D_2$ ($L_3 > 2D_2$) from a practical viewpoint.

In addition, it is also desirable that the length ($L_1 + L_2$), i.e. the total length of the branching portion 4 and the divergent portion 2 is long enough to prevent the fluid from over striking the cover portion 5. When the fluid strikes the cover portion 5 with an excessive force, the occurrence of an over turbulent flow is inevitable. Therefore, it is desirable to make the length ($L_1 + L_2$) longer than the diameter $D_1$ of the branching portion 4 ($L_1 + L_2 > D_1$).

It is also desirable to arrange the branch pipes 3 in such a way that the branch pipes 3 extend into the branching portion 4 through the cover portion 5 at a distance $L_1$ long enough to avoid an introduction of fluctuations of the fluid into the branch pipes 3 in the form of a turbulent flow, which is sometimes formed in an area adjacent to the cover portion 5 upon striking against the cover portion 5. It is also advantageous that the length $L_1$ is long enough to produce a steady flow of the fluid which has reversed in direction at the cover portion 5. For these purposes, it is advisable to make the length $L_1$ longer than half of the diameter $D_1$ of the branching portion 4 ($L_1 > \frac{1}{2}D_1$). And, for general purposes, it is desirable that the length $L_1$ be longer than the diameter $D_1$ ($L_1 > D_1$).

Furthermore, since the fluid supplied from the inlet pipe portion 1 is easily and advantageously changed to a steady flow by reversing its direction at the cover portion 5 and then introducing the fluid into the branch pipes 3, it is desirable to arrange the branch pipes 3 outside the diameter of the inlet pipe portion 1 in the radial direction thereof (see FIG. 2) in order to prevent the fluid from directly flowing into the branch pipes 3. According to the above construction, the proportion of fluid which directly flows into the branch pipes 3 is relatively small with respect to the total amount of the fluid supplied through the inlet pipe portion 1.

Figure 4:
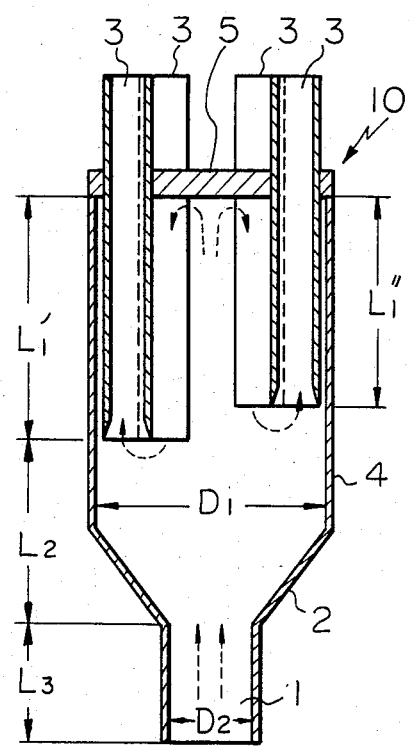
FIG. 4 through FIG. 7 are sectional views of other embodiments of the present invention.

FIG. 4 shows another embodiment of the present invention, in which the length $L_1''$ of one of the branch pipes 3 is shorter than the length $L_1'$ of another branch pipe 3. That is, the branch pipes 3 are provided through any conventional means in such a way that the length $L_1$ of the branch pipe 3 is variable or adjustable independently from each other. In such a case as shown in FIG. 4, the average of the length $L_1'$, $L_1''$ ... is longer than half of the diameter $D_1$ of the branching portion 4 (average $L_1 > \frac{1}{2}D_1$).

It is herein to be noted that a flow rate of the powdered coal supplied through a branch pipe 3 may be varied by changing the length $L_1$ of the branch pipe 3. The shorter the length $L_1$, the smaller the flow rate of the powdered coal in the branch pipe 3. In other words, the longer the length $L_1$, the larger the powdered coal flow rate in the branch pipe 3.

Figure 5:
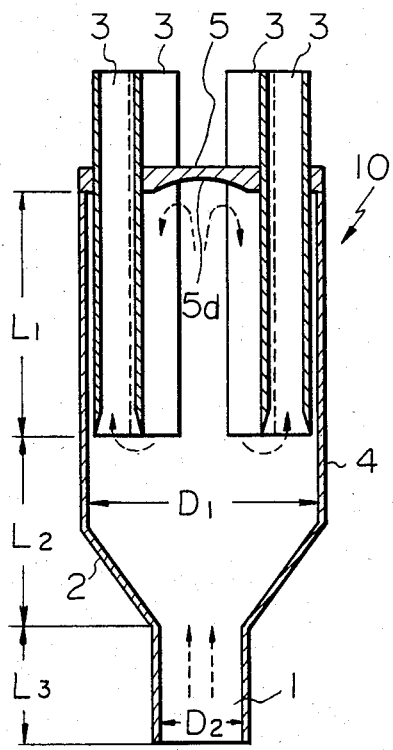

FIG. 5 shows still another embodiment of the present invention. A concave portion 5a is provided in the center of an inner surface of the cover portion 5. The concave portion 5a is provided so as to suppress the formation of a turbulent flow when the fluid supplied from the inlet pipe portion 1 strikes against the cover portion 5. Thus, it is possible to eliminate fluctuations in the flow rate among the branch pipes 3 and also to achieve a precisely controlled distribution of fluid. Further, it is also possible to shorten the length $L_1$, so that the length $L_1$ is longer than half of the diameter $D_1$ of the branching portion 4. What is more, it is desirable that the length $L_1$ be longer than the diameter $D_1$ in such a case as shown in FIGS. 2 and 3, which is free of such a concave portion.

Figure 6:
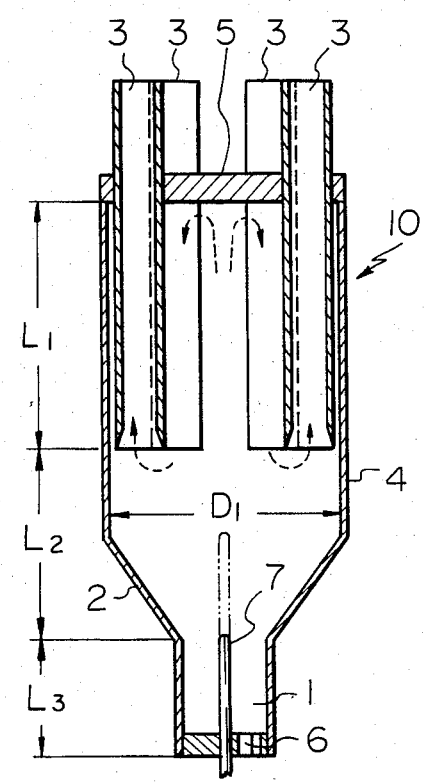

FIG. 6 shows still another embodiment of the present invention, in which a rim 6 is fixed to the inlet pipe portion 1 at an end thereof facing the main pipe side. The rim 6 comprises an outer periphery portion, an inner portion and two arms for connecting them to each other. A flow-regulating rod 7 is provided along the longitudinal axis of the inlet pipe portion 1 and extends through the inner portion of the rim 6. The flow-regulating rod 7 is arranged in such a way that it may be partially inserted into the divergent portion 2 or the branching portion 4 for predetermined distances. Sometimes the kinetic energy of the fluid is so small that the fluid flowing out of the inlet pipe portion 1 does not flow in a straight line, but goes in different directions. In such a case, the flow-regulating rod 7 can be moved forward to a position within the branching portion 4, as shown by the phantom line in FIG. 6, in order to guide the fluid along the rod 7 thereby preventing directional deviations of the fluid.

In place of the rod 7, a pipe may be provided, through which powdered coal carried on a carrier gas is supplied to the divergent portion 2 or the branching portion 4. The provision of the pipe instead of the rod 7 is also effective for regulating the flow of the fluid.

Figure 7:
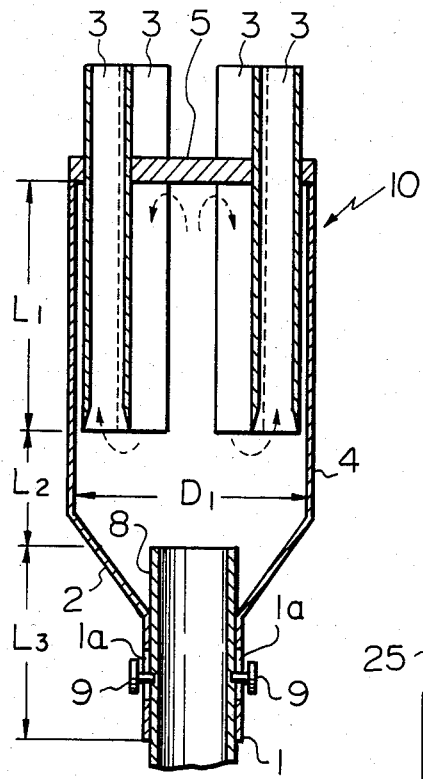

FIG. 7 shows still another embodiment of the present invention in which a pipe 8 is slidably inserted in the inlet pipe portion 1. The pipe 8 is fixed with clamp bolts 9 which are inserted into through-holes 1a formed along the length of the inlet pipe portion 1. According to this modification, the fluid supplied from the main pipe is introduced into the branching portion 4 through the outlet of the above pipe 8. Thus, in case the kinetic energy of the fluid is extremely small, the pipe 8 is moved forward into the branching portion 4 to shorten the length $L_2$ between the outlet end of the inlet pipe portion 1 and the inlet ends of the branch pipes 3, i.e. the length between the outlet end of pipe 8 and the inlet ends of the branch pipes 3. The pipe 8 may be fixed at any position by means of the clamp bolts 9. Therefore, the major part of the fluid flows straight on until it strikes against the cover portion 5, and then uniformly flows into the branch pipes 3, making it possible to uniformly distribute the fluid to each of the branch pipes 3 in a steady flow, even when the kinetic energy of the fluid is extremely small.

Figure 8:
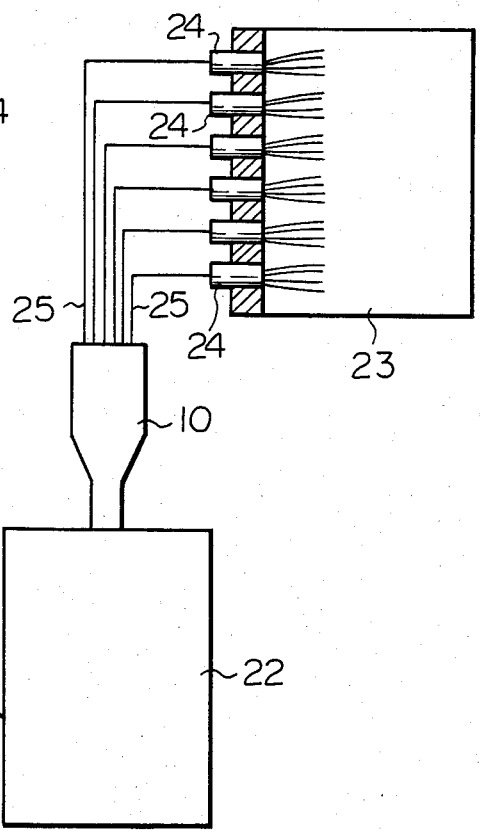
FIG. 8 is a diagrammatical view showing the operation of a fluid distributor according to the present invention.

FIG. 8 schematically illustrates an arrangement of a powdered coal burner system, in which the distributor of this invention is employed. Coal is first fed from a coal source 21 to a mill 22 where it is crushed. The thus crushed powdered coal is then carried on a carrier gas to a fluid distributor 10 constructed according to the present invention, in which the fluid including powdered coal is uniformly distributed to each of the branch pipes 25. The thus uniformly distributed powdered coal is burned (combusted) with burners 24 provided in a combustion furnace 23.

Figure 9:
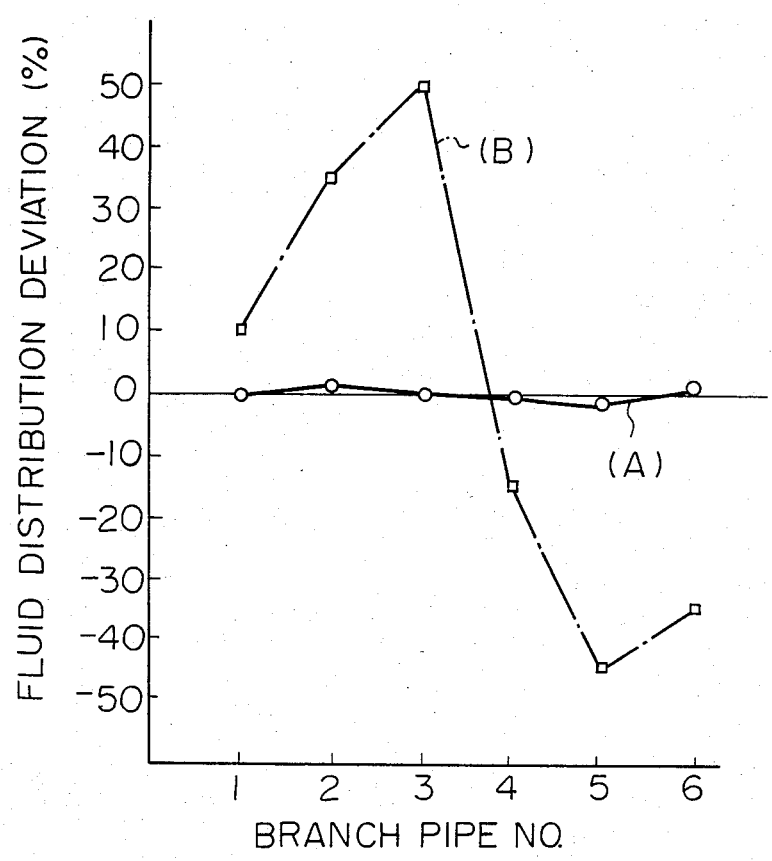
FIG. 9 is a graph showing fluctuations in the flow rate of distributed fluid from a target value.

FIG. 9 is a graph showing the fluid distribution to a plurality of branch pipes, for the fluid distributor of the present invention shown in FIGS. 2 and 3 and for a conventional distributor such as shown in FIG. 1. Wide deviations ($\pm 50\%$) in flow rate from a predetermined value were found when the conventional distributor was used. However, according to the distributor of the present invention the deviation in flow rate was within $\pm 2\%$. This shows that a precise distribution of the fluid can be accomplished with extremely good accuracy in accordance with the present invention.

The data shown in FIG. 9 were obtained when powdered coal was supplied to the distributor at a flow rate of 200 kg/hr together with a carrier gas (air) at a rate of 300 Nm$^2$/hr.

Though the present invention has been described with reference to powdered coal on a carrier gas, it should be noted that the distributor of the present invention may be applicable to other fluids including various kinds of gases, liquids and the like. In addition, the distributor of the present invention may be used at multi-stages, and an additional distributor to further increase the number of destinations can be utilized. In case of powdered coal, the distributor of the present invention may be applied not only to the distribution of the powdered coal to the respective burners of a combustion furnace, but also to the distribution and supply of the powdered coal to the respective tuyeres of a blast furnace.

Thus, it is to be understood that variations and modifications may be employed without departing from the concept of the invention as defined in the following claims.

We claim:

1. A distributor for distributing a fluid containing solids carried on a carrier gas from a main pipe to a plurality of branch pipes, comprising a cylindrical inlet pipe portion for the introduction of fluid supplied through said main pipe, a branching portion one end of which concentrically communicates with said inlet pipe portion, a cover portion located at the other end of said branching portion, said cover portion having an inner surface and a plurality of branch pipes which extend through said cover portion for carrying a distributed fluid, the diameter of said branching portion being larger than that of said inlet pipe portion, said plurality of branch pipes being arranged at equally spaced positions on a circle which is concentric with said branching portion, and each of said branch pipes extending into said branching portion.

2. A distributor as defined in claim 1, in which the length of the inlet pipe portion is more than twice the diameter thereof.

3. A distributor as defined in claim 1, in which the distance between the inner end of said inlet pipe portion and the inner surface of said cover portion is longer than the diameter of the branching portion.

4. A distributor as defined in claim 1, in which said branch pipes extend into said branching portion for a distance longer than half of the diameter of said branching portion.

5. A distributor as defined in claim 4, in which said distance is longer than the diameter of said branching portion.

6. A distributor as defined in claim 1, in which said plurality of branch pipes are arranged in such a way that the branch pipes are positioned outside the inlet pipe portion in its plan view.

7. A distributor as defined in claim 1, in which said cover portion is provided with a concave portion which faces said branching portion.

8. A distributor as defined in claim 1, in which a flow-regulating rod is positioned along the longitudinal axis of said inlet pipe portion, said rod being extendible into a divergent portion connecting said branching portion and said inlet pipe portion as well as into said branching portion.

9. A distributor as defined in claim 8, in which in place of said rod, a pipe is provided, through which a fluid is supplied to said divergent portion or said branching portion.

10. A distributor as defined in claim 1, in which an auxiliary pipe is inserted in said cylindrical inlet pipe portion, said auxiliary pipe being extendible into said branching portion so as to adjust the distance between the inlet ends of said branch pipes and the outlet end of said inlet pipe portion.

11. A distributor for distributing a fluid from a main pipe to a plurality of branch pipes, characterized by comprising a cylindrical inlet pipe portion for the introduction of fluid supplied through said main pipe, a branching portion one end of which concentrically communicates with said inlet pipe portion, a cover portion located at the other end of said branching portion, and a plurality of branch pipes which extend through said cover portion for carrying a distributed fluid, the diameter of said branching portion being larger than that of said inlet pipe portion, said plurality of branch pipes being arranged at equally spaced positions on a circle which is concentric with said branching portion, and each of said branch pipes extending into said branching portion for an equal distance.

12. A distributor as defined in claim 11, in which the length of the inlet pipe portion is more than twice the diameter thereof.

13. A distributor as defined in claim 11, in which the distance between the inner end of said inlet pipe portion and the inner surface of said cover portion is longer than the diameter of the branching portion.

14. A distributor as defined in claim 11, in which said branch pipes extend into said branching portion for a distance longer than half of the diameter of said branching portion.

15. A distributor as defined in claim 14, in which said distance is longer than the diameter of said branching portion.

16. A distributor for distributing a fluid from a main pipe to a plurality of branch pipes, characterized by comprising a cylindrical inlet pipe portion for the introduction of fluid supplied through said main pipe, a branching portion one end of which concentrically communicates with said inlet pipe portion, a cover portion located at the other end of said branching portion, and plurality of branch pipes which extend through said cover portion for carrying a distributed fluid, the diameter of said branching portion being larger than that of said inlet pipe portion, said plurality of branch pipes being arranged at equally spaced positions on a circle which is concentric with said branching portion, and each of said branch pipes being provided in such a way that the length of said branch pipes extending into said branching portion may be adjustable and said branch pipes extend into said branching portion for different distances.

17. A distributor as defined in claim 16, in which the length of the inlet pipe portion is more than twice the diameter thereof.

18. A distributor as defined in claim 16, in which the distance between the inner end of said inlet pipe portion and inner surface of said cover portion is longer than the diameter of the branching portion.

19. A distributor as defined in claim 16, in which said branch pipes extend into said branching portion for a distance on the average longer than half of the diameter of said branching portion.

20. A distributor as defined in claim 19, in which said distance on the average is longer than the diameter of said branching portion.

* * * * *